(12) United States Patent
Kress

(10) Patent No.: US 6,220,081 B1
(45) Date of Patent: Apr. 24, 2001

(54) JOINING AREA FOR TWO PARTS THAT ARE TIGHTLY ASSEMBLED BUT DETACHABLE FROM EACH OTHER, IN PARTICULAR ON A CONTAINER FOR COLLECTING CONTAMINATED LIQUIDS SUCH AS LIQUID DIELECTRIC OF A TRANSFORMER

(76) Inventor: Hansjörg Kress, Zeppelinstrasse 8, D-79331, Teningen (DE)

( * ) Notice: Subject to any disclaimer, the term of this patent is extended or adjusted under 35 U.S.C. 154(b) by 0 days.

(21) Appl. No.: 09/214,681

(22) PCT Filed: Jul. 3, 1997

(86) PCT No.: PCT/EP97/03499

§ 371 Date: Jan. 7, 1999

§ 102(e) Date: Jan. 7, 1999

(87) PCT Pub. No.: WO98/01373

PCT Pub. Date: Jan. 15, 1998

(30) Foreign Application Priority Data

Jul. 8, 1996 (DE) .......................................... 296 11 767 U
Aug. 23, 1996 (DE) .......................................... 296 14 683 U
Nov. 29, 1996 (DE) .......................................... 296 20 778 U
Dec. 10, 1996 (DE) .......................................... 296 21 396 U

(51) Int. Cl.$^7$ .............................. G01D 21/00; G01M 3/28
(52) U.S. Cl. .................................. 73/46; 73/40; 73/49.3; 73/49.8
(58) Field of Search ............................... 73/37, 40, 40.7, 73/52, 46, 47, 49.3, 1.17, 49.8

(56) References Cited

U.S. PATENT DOCUMENTS 3,270,960 * 9/1966 Phillips ..................................... 73/37
3,956,604 * 5/1976 Larker et al. ............................ 73/40
4,420,970 12/1983 Organi .
4,926,680 5/1990 Hasha et al. .
5,170,659 12/1992 Kemp .

FOREIGN PATENT DOCUMENTS 4137632 3/1993 (DE) .

* cited by examiner

Primary Examiner—Hezron Williams
Assistant Examiner—Michael Cygan
(74) Attorney, Agent, or Firm—Bachman & LaPointe, P.C.

(57) ABSTRACT

On a container for collecting contaminated liquids which has container walls surrounding the base of the container or on a collecting vat for liquid dielectric of a transformer, at least one detachable container part being joined to the collecting container in a liquid tight manner, or at a joining area for two parts that are tightly assembled but detachable from each other, at least one monitoring chamber (46) is provided between the parts (56, 58) that are tightly assembled. The monitoring chamber (46) is connected to a current source at one end and to pressure monitoring device at the other end. The detachable container part (58) should be joined to a section (56) of the collecting container so as to form at least one chamber-like hollow (46). The hollow which serves as a monitoring chamber is tightly bordered by sealing elements (60$_c$) and by the surface of the detachable container part and by the surface of each section of the collecting tank which run between the sealing elements.

43 Claims, 13 Drawing Sheets

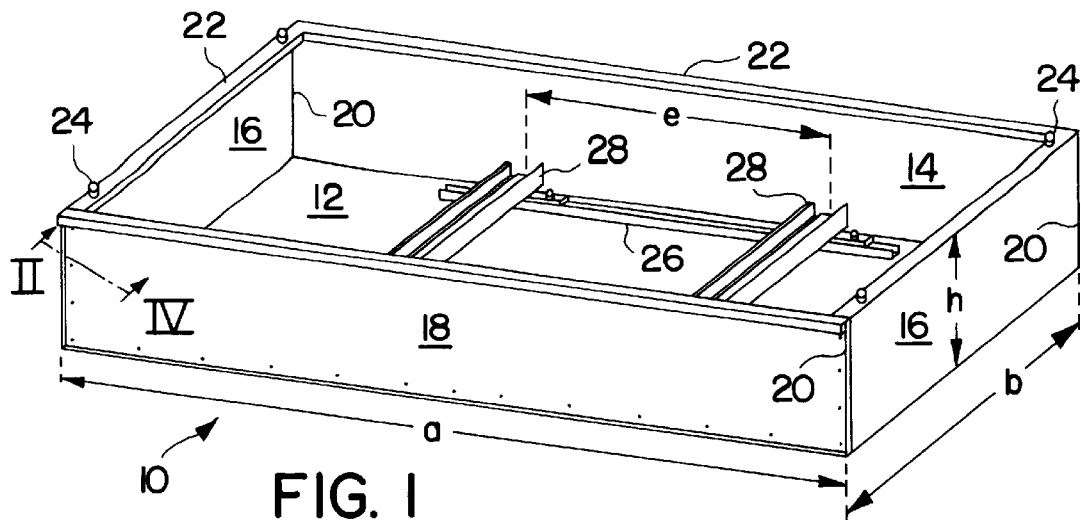
FIG. 1
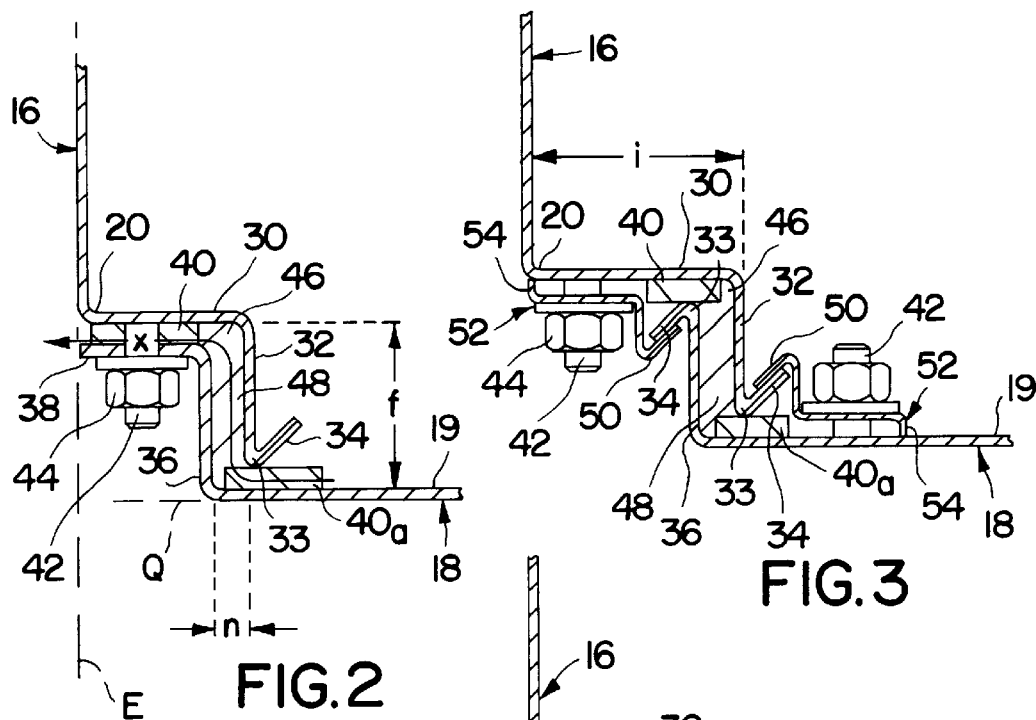
FIG. 2
FIG. 3
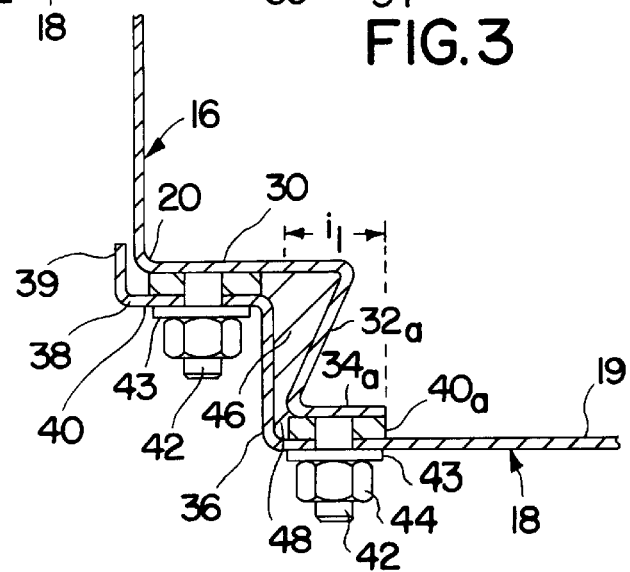
FIG. 4

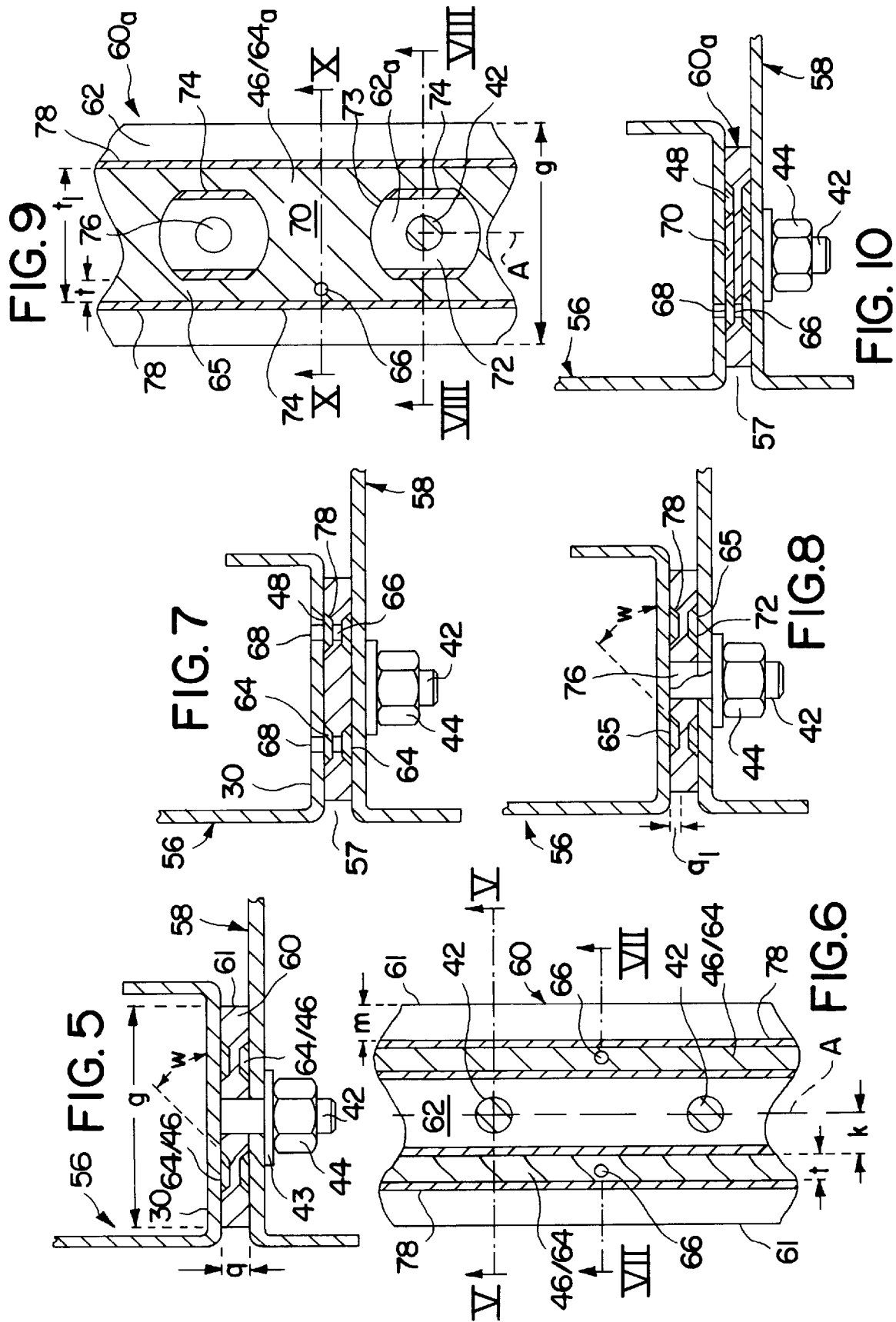

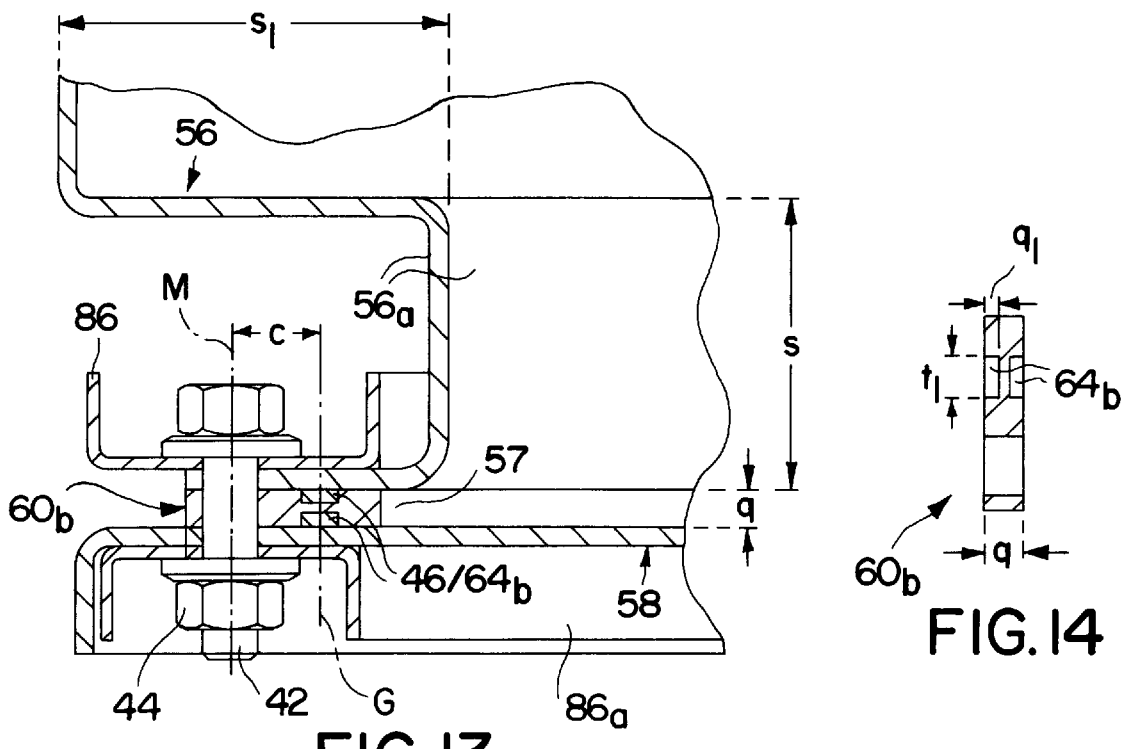
FIG. 13
FIG. 14
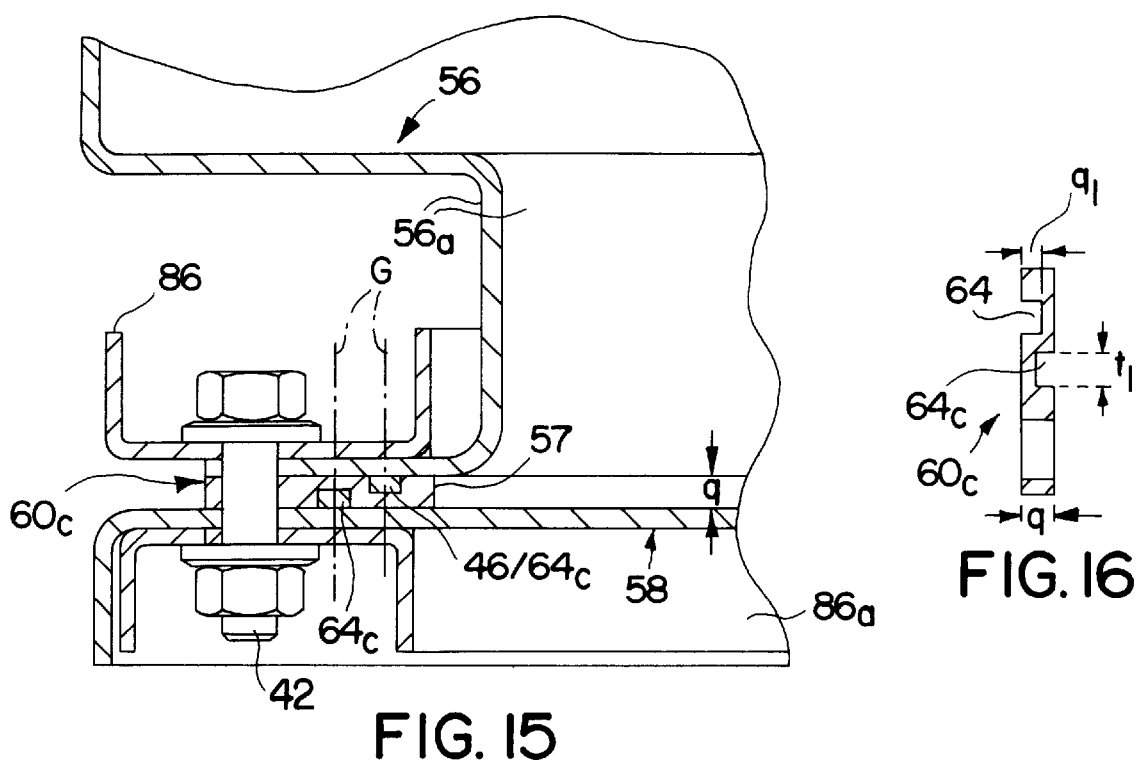
FIG. 15
FIG. 16

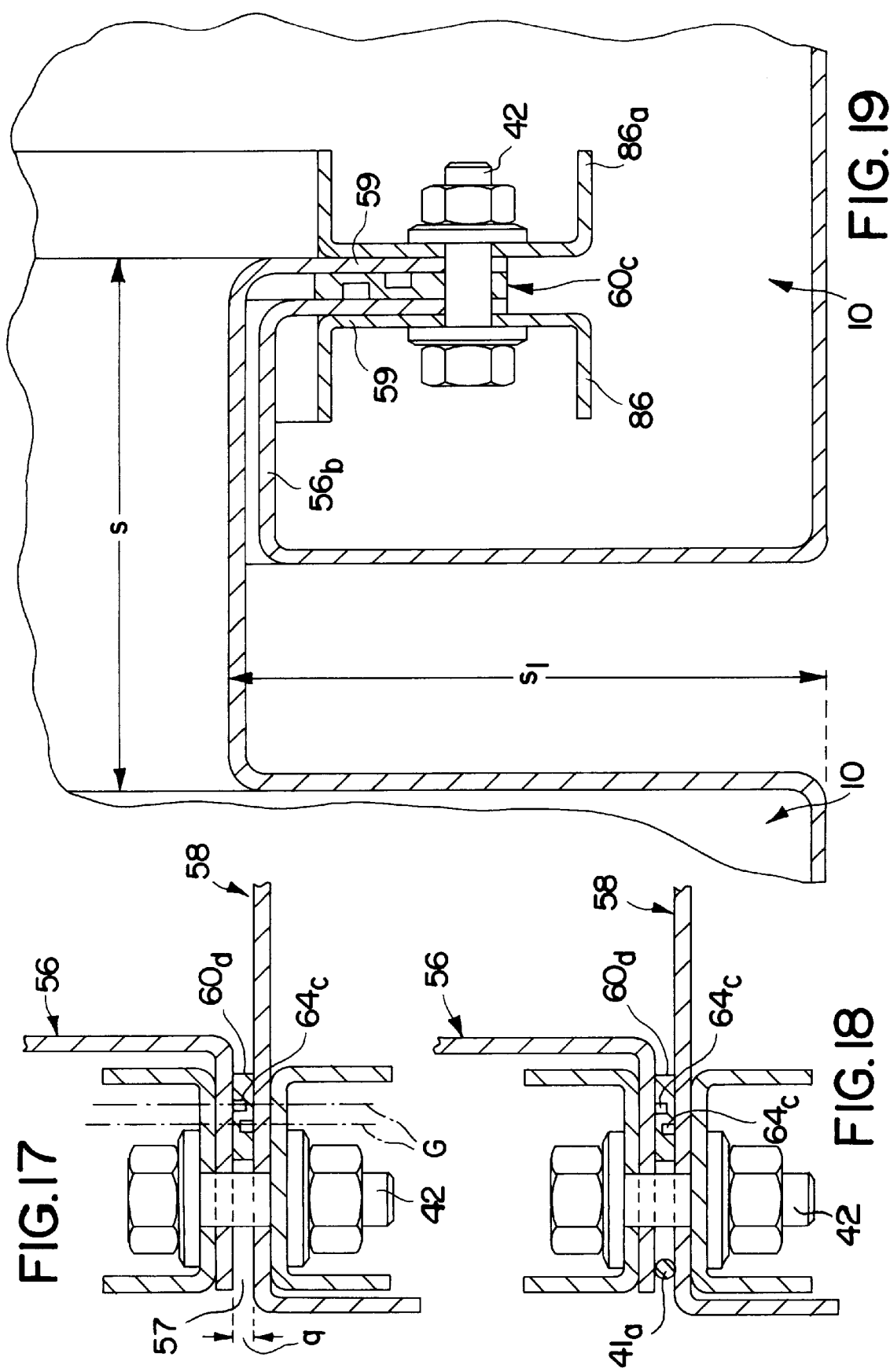

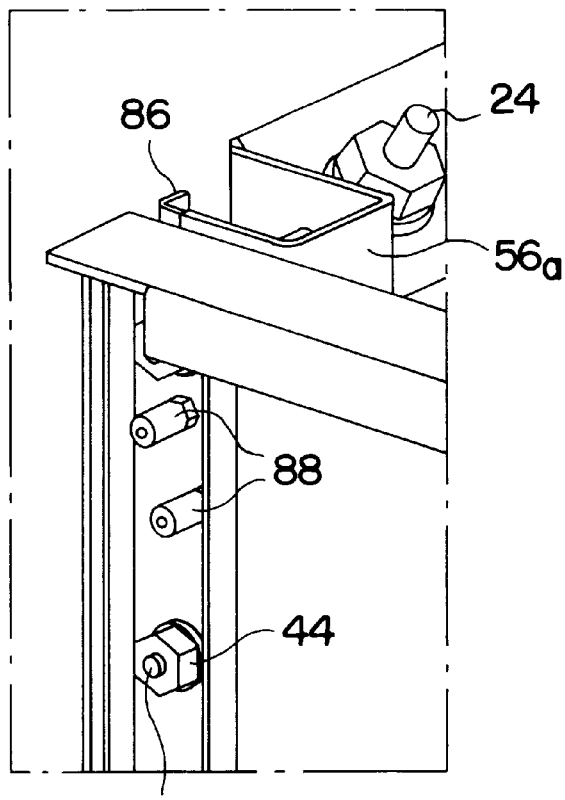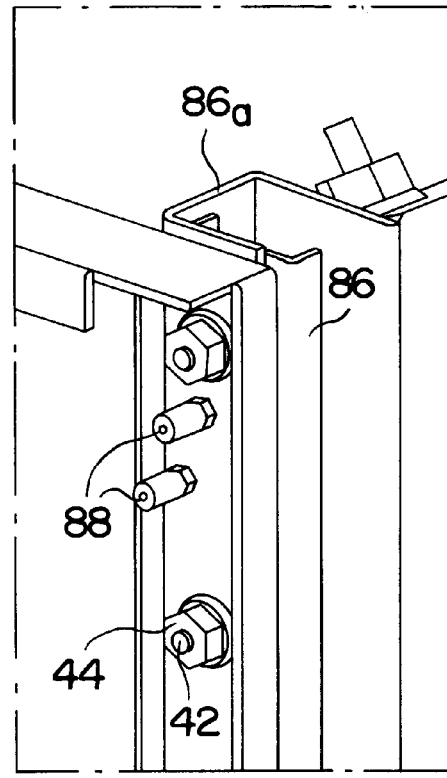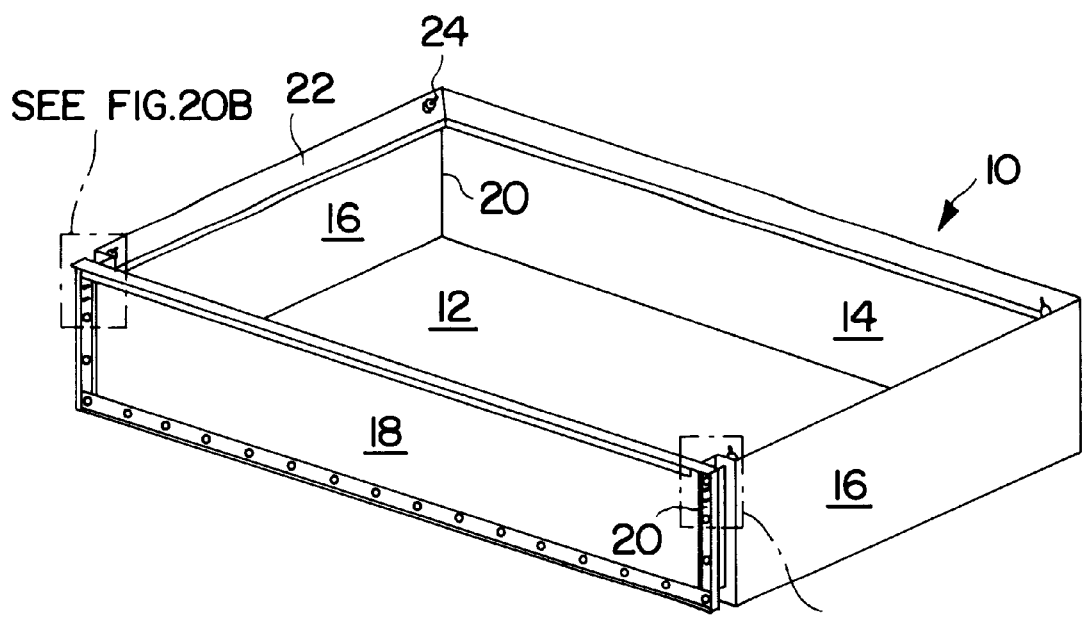

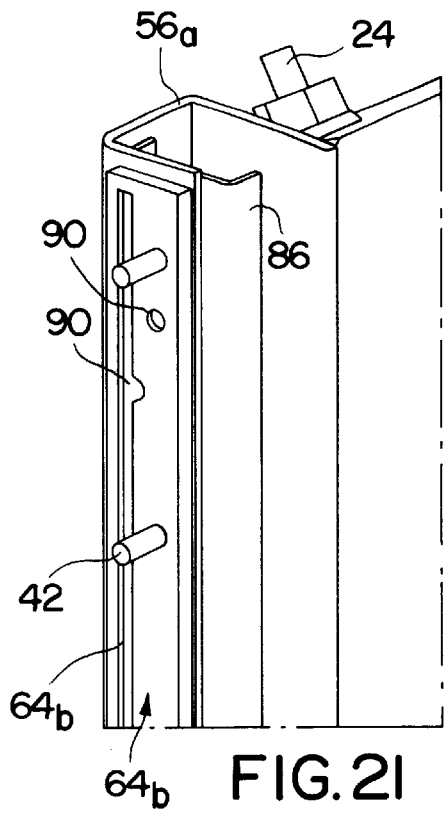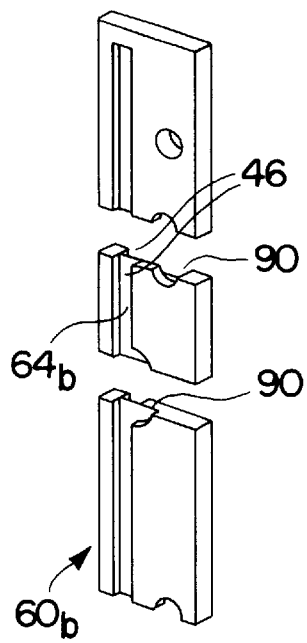
FIG.21   FIG.22
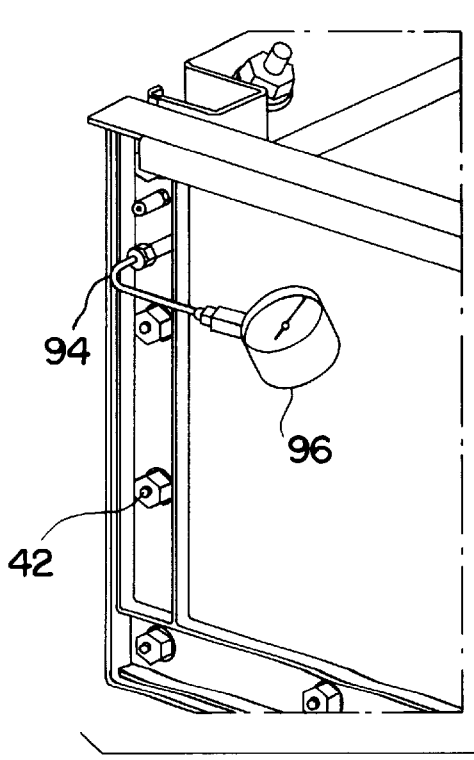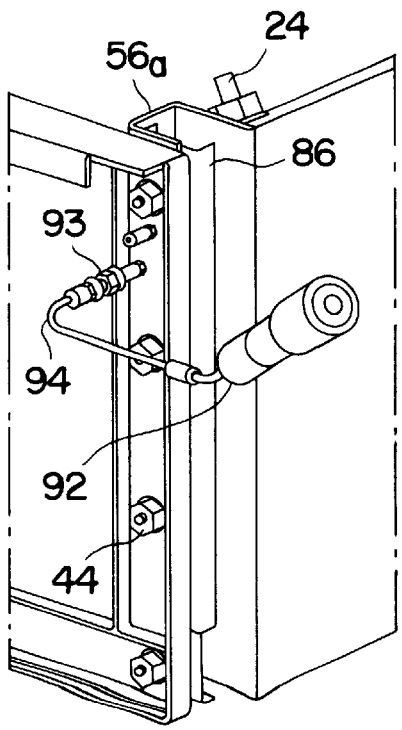
FIG.23

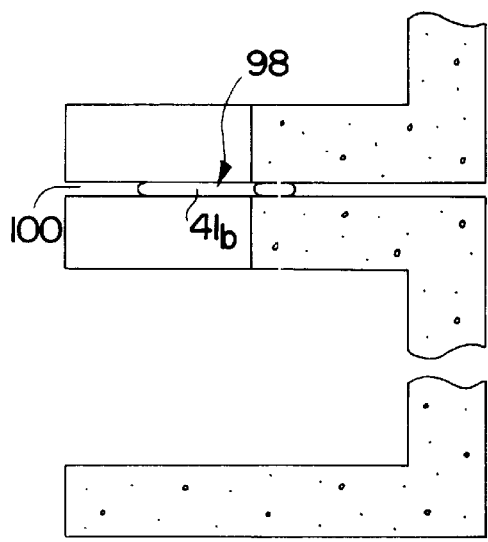
FIG. 24
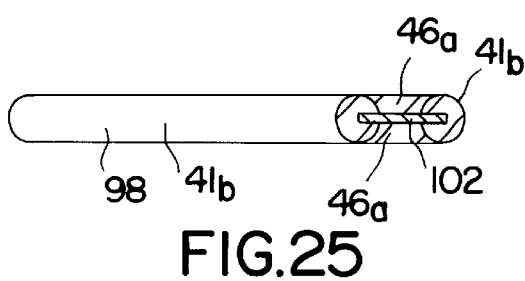
FIG. 25
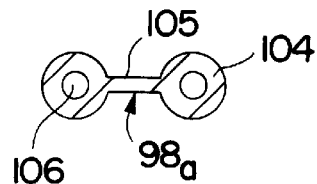
FIG. 27
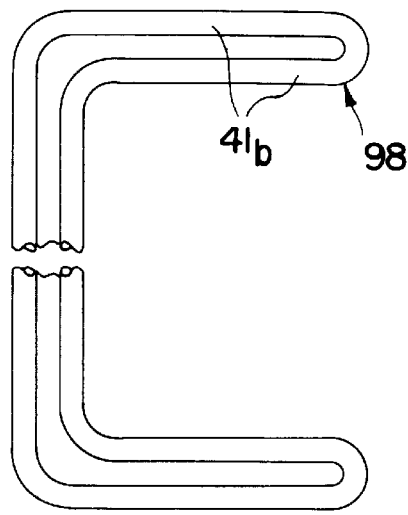
FIG. 26
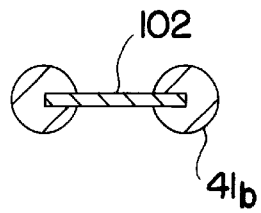
FIG. 26a
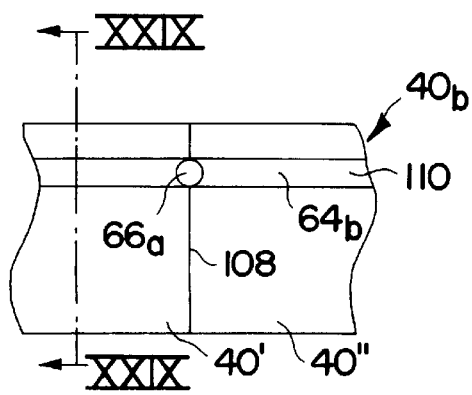
FIG. 28
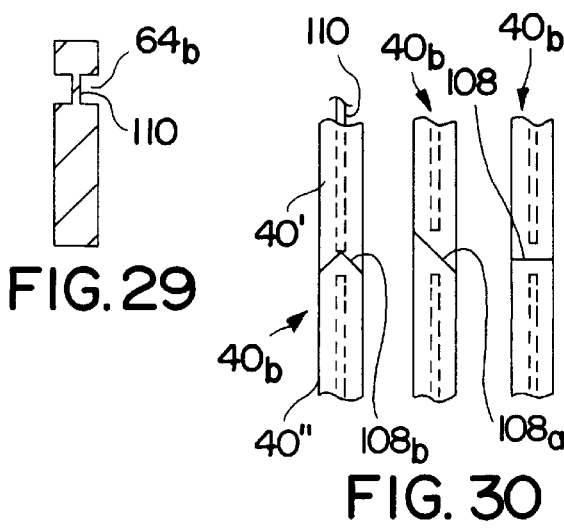
FIG. 29
FIG. 30

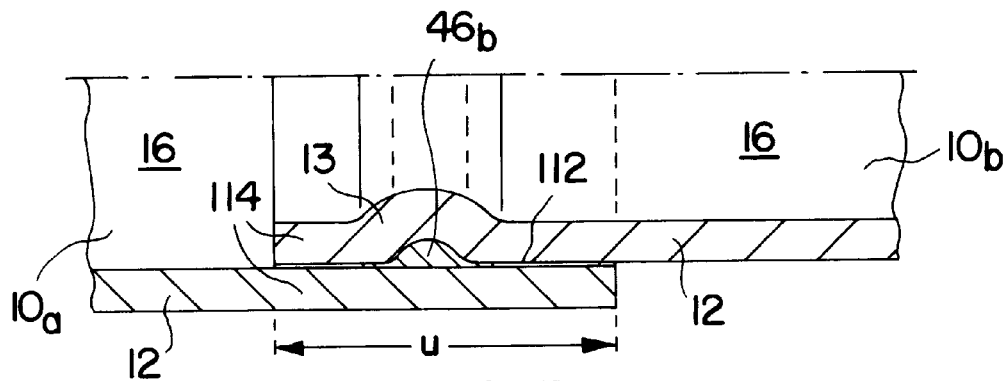
FIG. 31
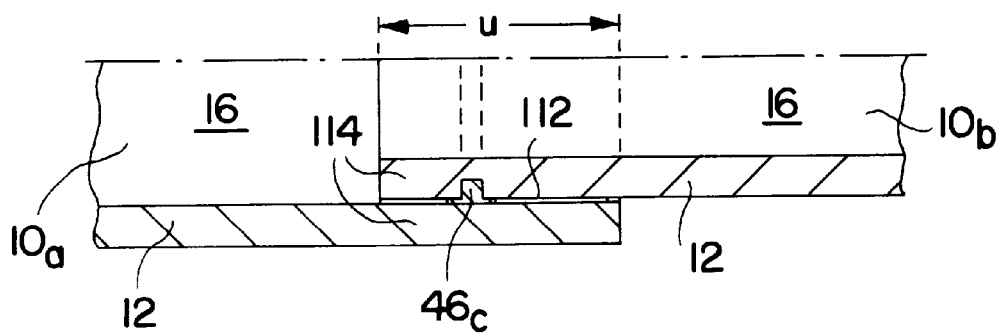
FIG. 32
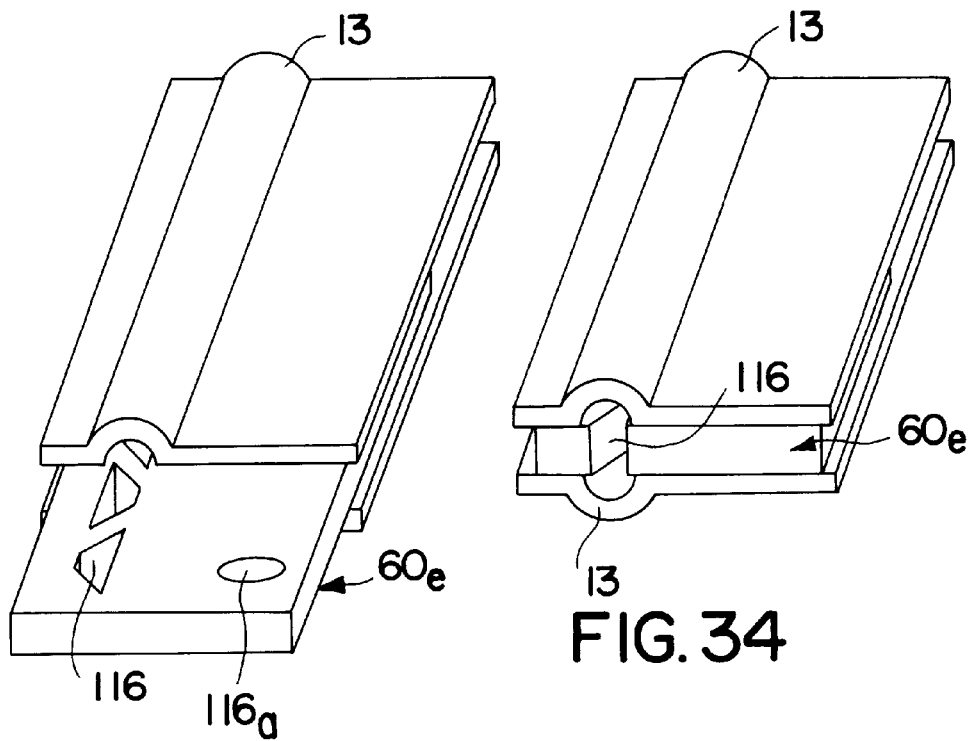
FIG. 33
FIG. 34

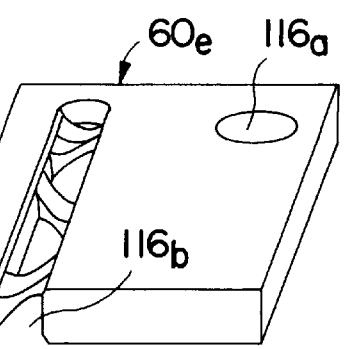
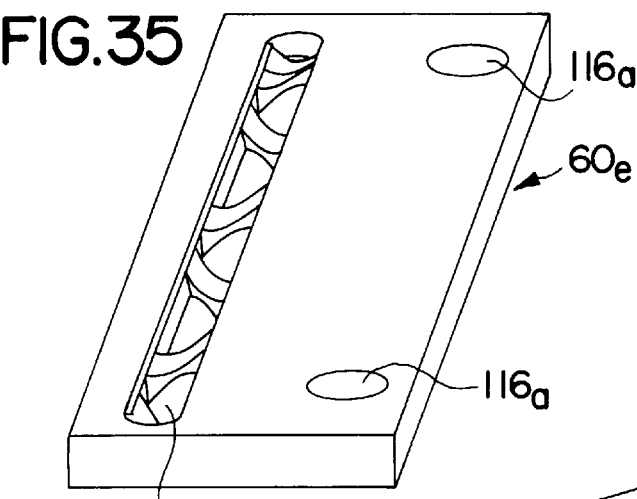
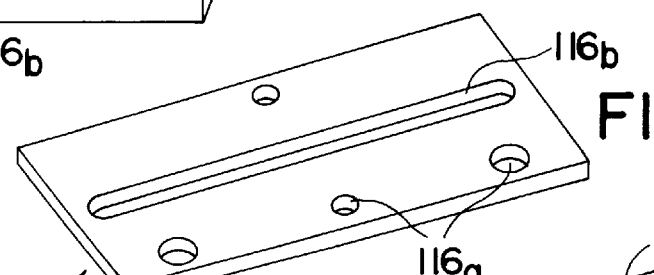
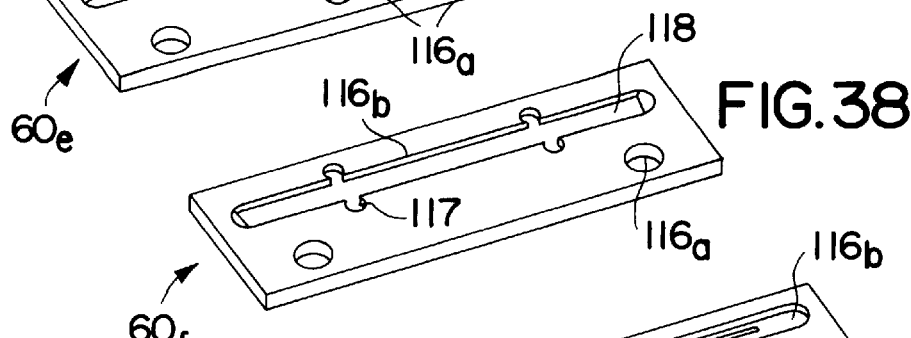
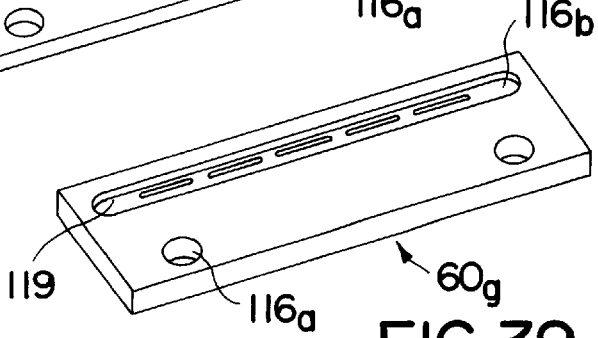
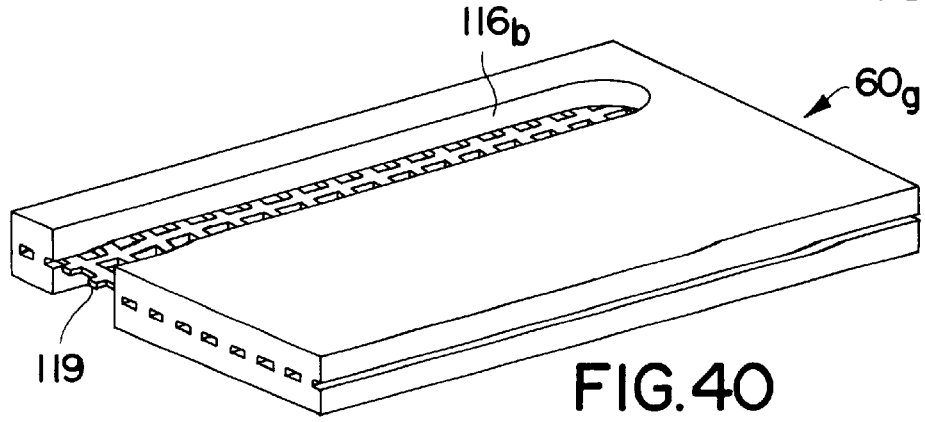

JOINING AREA FOR TWO PARTS THAT ARE TIGHTLY ASSEMBLED BUT DETACHABLE FROM EACH OTHER, IN PARTICULAR ON A CONTAINER FOR COLLECTING CONTAMINATED LIQUIDS SUCH AS LIQUID DIELECTRIC OF A TRANSFORMER

The invention concerns a monitoring system for two parts which are sealingly associated with each other and releasable from each other, as set forth in the classifying portion of the first claim.

DE 41 37 632 C1 discloses a catch pan or vat of steel sheet, from the bottom of which three welded side walls stand up. The fourth side wall is composed of two wall panels which define a cavity—with edge flanges, adjoining side walls and their own angle portions—and which are screwed with the interposition of seals at the joins between the wall parts; the screws can pass through the seals and compress them, sealing the cavity. The outer wall panel is provided with a connecting portion for a flow medium, for example water or compressed air. When the latter fills the cavity, it is possible for example by using soap in the sealing regions to carry out a test to ascertain whether the releasable side wall is gas-tightly or liquid-tightly integrated into the catch pan.

U.S. Pat. No. 4,420,970 discloses a monitoring system with a disk-shaped insulating element disposed between end flanges of metal tubes: the insulating element is provided towards the two end flanges with a respective annular groove for receiving a pair of O-rings. That annular groove forms a cavity which is defined by the O-rings and which is connected to a radial bore by means of a passage parallel to the axis of the tubes. The radial bore is closed by a screw and after removal thereof serves for leakage draining.

The specification of DE 92 02 421 U describes a catch pan or tank with guide profiles associated with the pan bottom at the inside thereof, for the transformer which is on rails in the transformer casing in order to simplify introducing or replacing the transformer or in order to compensate for differences between the bottom of the casing and the surface of the ground surrounding the station. In such previously known catch pans, the spacing of the guide profiles from each other corresponds to the spacing of the rails in the building, which, when the catch pan is introduced into the building, can serve as support elements for the catch pan which then rests on them. That is intended in particular to permit already existing buildings to be subsequently equipped with such an arrangement. The front wall of the catch pan is removable and is liquid-tightly screwed to an abutment rim of the catch pan, with the interposition of a sealing strip.

Catch pans of that kind comprising steel with a safety flange have proven their worth in particular in the renovation and refurbishment of old transformer station buildings with pan-less transformers. However, such catch pans with a flange are generally not allowed for use in ground water preservation areas as it is not possible to check and monitor the seal over a prolonged service life; the seal is subject to service demands and loading only in an accident or damage situation. that is to say under some circumstances after decades.

The "Anforderungen an Auffangwannen aus Stahl . . . " (translation: Demands on catch pans of steel . . . ) of the Landerarbeitsgemeinschaft Wasser (LAWA) (translation: Regional Water Association) of Jun. 22, 1992 (GABL. 1992, pages 583–587) mention liquid-tight components of steel for receiving and retaining substances such as to endanger water, which inter alia must be so designed that the underneath can be checked for corrosion and the individual parts of which must be welded; screw connections with seals are not permissible beneath the maximum possible level of liquid in the catch pan.

In consideration of that state of the art the inventor set himself the aim of improving the design structure of containers or catch pans of that kind and permitting the use of pan parts which can be separated or released—while affording sealing integrity—without limitation. In addition the invention seeks to provide a connecting system which affords sealing integrity and which can be used even with other pairings to be connected of apparatus parts.

That object is attained by the teaching of the independent claim: the appendant claims set forth desirable configurations.

In accordance with the invention there are provided at least two sealing profiles which are disposed at a spacing in succession in the possible flow path for container content and the monitoring chamber is connected to a pressure monitoring device. This system according to the invention also makes it possible to provide for continuity testing in respect of a plurality of successively coupled sealing regions.

The monitoring chamber disposed in the notional flow path of issuing container or pan contents is filled with a flow medium, preferably with a monitoring liquid which can be easily monitored by visual control in the event of undesired escape from the test space or however with a gas; the filling of the test space or the monitoring chamber can be monitored in respect of pressure by suitable measuring devices and thus leakages can be detected.

Although seals of the most widely varying configurations, that is to say also adhesive seals, can be utilized for the use according to the invention, the above-mentioned sealing profiles which are disposed in the possible flow path, in particular two thereof, disposed at a spacing in succession, have proven to be desirable. A screw bolt or the like connecting member is to pass through ones of those sealing profiles—or also both—, the screw bolt or the like connecting member connecting the releasable part of the container and the portion of the catch container, which is associated with the monitoring chamber. If only one of the sealing profiles is affected by the screw bolt or like connecting member, the other is pressed by an end edge of the catch container against the releasable part of the container.

It is also possible for each of the sealing profiles to be sealingly held between two surfaces of the container part or the catch container, said surfaces being parallel and being brought together by a screw connection.

In accordance with a further feature of the invention both sealing profiles which are disposed at a spacing in succession in the possible flow path for the container content can be respectively held in clamping relationship by an end edge, namely the one by an end edge of the releasable container part and the other by an end edge of the catch container; in that case, the respective other counterpart member serves as a support means, that is to say for example the catch container serves as the support means for the sealing profile which is contacted by the end edge of the releasable container part.

Moreover that end edge is formed by the edge of a hook strip being angled through more than 90° out of the surface of the releasable part or the abutment portion of the catch container.

An advantageous configuration of the connecting region for forming the monitoring chamber according to the invention is distinguished in that the hook bar has a clamping profile engaging thereover, and is fixed thereby to the respective other counterpart member of the connection. That clamping profile can be held at a spacing from the surface of its counterpart fixing member by a support leg at one side, and can be connected to the counterpart member by at least one screw connection: that arrangement thus affords a fixing for the hook bar, which has a resilient take-up effect. In this case the releasable container part or flange cover is pressed in position by virtue of the clamping profile by means of screwthreaded pins or studs which are welded in place outside the sealing arrangement, so that the sealing profile itself can be used without a hole therein.

In accordance with the invention the sealing profile can be in the form of a round profile or a sealing cord; the two round profiles are held at a spacing in pair-wise relationship with each other by a for example channel-like intermediate profile member, comprising a material such as to ensure that the spacing between the round profiles is maintained. On the outside the round profiles each bear against a clamping profile which is preferably curved or bent in an L-shape and held by a screw bolt to the pan.

Overall it has proven desirable for the fixing regions of the two counterpart members for producing the gap which contains the monitoring chamber and which accommodates the sealing profiles to be of such a configuration that both the releasable container part and also the portion of the catch container in the connecting region is doubly bent, forming a respective connecting surface or a side surface respectively and, adjoining same, a flank surface and an abutment strip portion; the flank surface and the side surface are to delimit the monitoring chamber or the test space—being disposed approximately parallel at a spacing relative to each other.

Instead of a pair of sealing profiles, it is also possible in accordance with the invention to use only one single sealing strip of greater width; it is inserted in the connecting region between parallel surfaces of the releasable container part and the associated portion of the catch container; formed in its two surfaces is at least one groove which is sealingly closed by the part, which extends over same, of the connecting region, relative to the monitoring chamber.

In an embodiment of the sealing strip portion extending on each respective side of its longitudinal axis in a surface is at least one respective groove which is connected to a corresponding groove in the other strip portion surface by at least one opening to form a communicating monitoring system. In that respect, the bottom width of the groove which is of trapezoidal cross-section—with an angle of inclination of the walls thereof of about 45°—is to correspond to approximately a tenth to a quarter of the width of the sealing strip portion, that is to say it is to measure for example 5 mm. In this case screw elements pass through the sealing strip portion on its longitudinal axis, and outside the grooves; the above-mentioned communicating monitoring systems are disposed—in mutually separated relationship—at both sides of the screw region.

Another sealing strip portion according to the invention affords at each of its surfaces a groove which occupies almost the entire width thereof and from the groove bottom of which shaped portions project upwardly at openings for the screw bolts; the shaped portions define in terms of cross-section with the groove walls groove passages which extend the groove in parallel relationship with the longitudinal axis thereof. In addition the surfaces of the shaped portions are to be aligned with the surface of the sealing strip portion in order to ensure sealing integrity in respect of the above-mentioned openings.

Advantageously, an opening is to be provided between two shaped portions and near a groove wall, which opening connects the two grooves of the sealing strip portion together and thus provides a unitary monitoring chamber.

In order to be able to fit the above-mentioned monitoring devices, a bore is to be associated with at least one of those connecting openings in the sealing strip portion, the bore being disposed in the adjacent region of the catch container.

An embodiment of the sealing profile which has proven to be desirable, is one which comprises two round profiles connected by a web; here each of the sides of the web defines a monitoring chamber which on the other hand is spanned by a fitted part—for example a concrete wall.

Preferred in this case are two hollow elongate portions or profiles of elastic material, which are connected by an intermediate web integrally formed thereon.

Sealing profiles according to the invention can be prolonged by adhesive joins. To provide for monitoring sealing integrity thereof, it is possible to provide in the adhesive zone an opening which connects both profile surfaces and which preferably extends in the region of a pair of grooves with a common central axis.

In accordance with another feature of the invention, inserted between two mutually associated plate-like parts is a sealing strip with a continuous groove-like opening or a series or row of polygonal or round openings, and associated with the openings is at least one channel-like bottom bead or ridge of the plate-like part or parts, wherein the channel space is open to the opening or openings and defines the monitoring chamber. An intermediate bottom portion or a grid insert can extend through such a sealing strip.

Also in accordance with the invention is a plate-like sealing disk with at least one annular groove and/or a ring-like arrangement of round or polygonal openings.

The sealing disk may additionally have a central opening which is of significance in particular when there is associated with the sealing disk, at least at one side, a flange of a hollow profile, the hollow space or cavity of which then connects to the central opening.

In addition plate pairings of general kind can be connected with the interposition of the sealing disk; in this respect, it is possible for the sealing disk and the plates to be assembled by a two-part nut-like insert which passes through the central opening. A part of the nut-like insert preferably engages with a screwthreaded collar into a screwthreaded groove defined by a screwthreaded collar on the other part.

The invention also includes the possibility of assembling containers—for example a catch pan—from a plurality of overlapping parts; then, disposed in the overlap region are the monitoring chambers, preferably in the form of a configuration formed in one of the container bottoms or sides. It is also possible with the connecting region according to the invention for two adjacent containers—for example catch pans—to be sealingly connected together to constitute a unit.

It is also an aspect of significance that the monitoring chamber or the test space, in the event of a loss of sealing integrity, can be filled with a sealing spray which restores sealing integrity—similarly to a tire repair set.

If checking of sealing integrity is implemented by way of a reduced pressure, it has proven to be desirable to implement an emergency sealing function by means of an increase in the reduced pressure and the enhancement, which is involved therewith, of the contact pressure applied to the seal.

To increase the catch surface area, it is also possible to connect to at least one wall of the catch container a run-in surface which is fitted onto the edge of the container at an angle of inclination of for example 40°. That run-in surface is to be provided, outside the edge of the container. with a side edge and—for fixing to the edge of the container—with an end angle configuration. A support profile between the wall of the catch container and the run-in surface secures it in position.

By virtue of fitment plates of that kind or in another simple manner, the invention affords the possibility of producing a larger pan or vat system from a plurality of pan or vat portions. In that case, seals are disposed beneath the maximum filling level.

As stated, protection is also sought separately for the above-discussed features when they are used in areas other than that of a catch pan or vat for transformer liquid, for example in connection with a use on pressure containers or vessels, as are to be found in connection with so-called SF6-switching installations.

Further advantages, features and details of the invention will be apparent from the following description of preferred embodiments and with reference to the drawing in which:

FIG. 1 is a perspective view of a catch pan or vat for contaminating liquid, in particular for insulating liquid of a transformer of the energy industry.

FIGS. 2 through 4 are views in cross-section on an enlarged scale in comparison with FIG. 1 taken along line II–IV through different configurations of the connection of a separate wall of the catch pan, FIGS. 5, 7 and 8, 10 show two other embodiments of connections of separate wall parts with strip-like sealing elements shown as cross-sections through portions of the catch pan, in section approximately along line V—V and VII—VII in FIG. 6 and along line VIII—VIII and X—X in FIG. 9.

FIGS. 6 and 9 each show a plan view of the sealing element shown in cross-section in FIGS. 5, 7 and 8, 10 respectively.

FIGS. 11, 13, 15, 17, 18 each show a cross-section through other embodiments of two respective wall parts with interposed sealing element, FIG. 12 is a view in cross-section through a catch pan, FIGS. 14 and 16 each show a view in cross-section through the sealing elements of FIGS. 13 and 15 respectively, FIG. 19 is a partial view in cross-section through two catch pans which are connected together, FIG. 20A is perspective view of a catch pan, with FIGS. 20B and 20C showing associated views on an enlarged scale of portions thereof, FIG. 21 shows a perspective view of a detail of a catch pan, FIG. 22 shows a perspective view of a sealing element, FIG. 23 shows a perspective view of two portions of a catch pan, FIG. 24 is a diagrammatic view relating to a sealing element in a concrete join in connection with a catch pan, FIG. 25 is a view on an enlarged scale of a portion from FIG. 24, FIG. 26 is a plan view of a sealing element as shown in FIG. 25 with associated cross-section on an enlarged scale, FIG. 27 shows another cross-sectional configuration of the sealing element of FIG. 26, FIG. 28 shows a plan view of a band-like sealing element with adhesive join between two parts of the sealing element, FIG. 29 shows a view in cross-section through the sealing element of FIG. 28 taken along line XXIX—XXIX.

FIG. 30 shows side views of three sealing elements with different configurations in respect of the adhesive join thereof, FIGS. 31 and 32 show two partial longitudinal sections through catch pans comprising pan parts which are in mutually overlapping relationship and which are glued to each other, FIGS. 33 and 34 show perspective views of different adhesive or sealing regions, FIGS. 35 through 40 show perspective views of sealing strip portions of different configurations, FIGS. 41 and 42 show views in cross-section through different sealing strip portions, FIGS. 43, 44 and 49 show perspective views of respective sealing disks.

Figure 47:
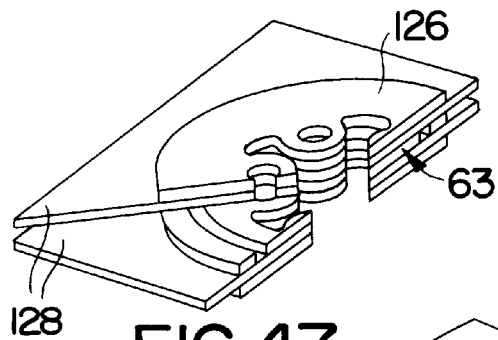
Figure 46:
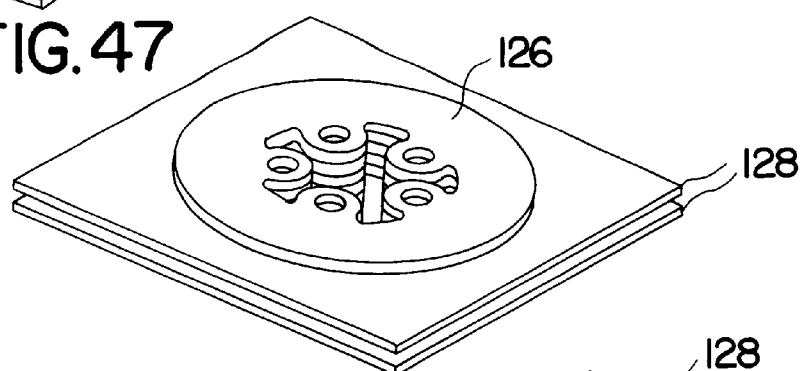
FIGS. 46 and 48 show perspective views of other uses.
Figure 48:
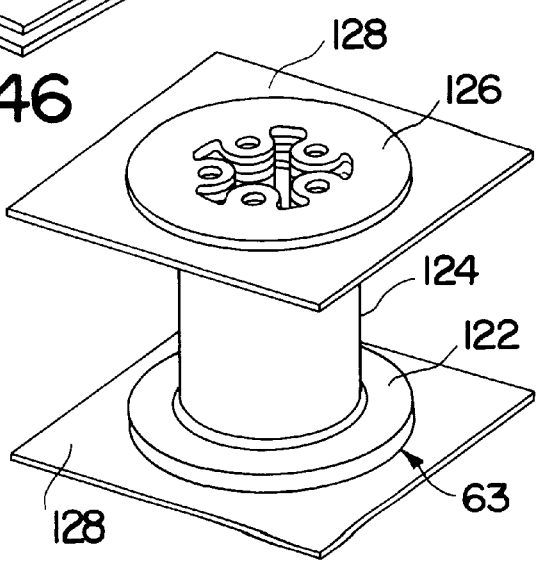
Figures 50, 52:
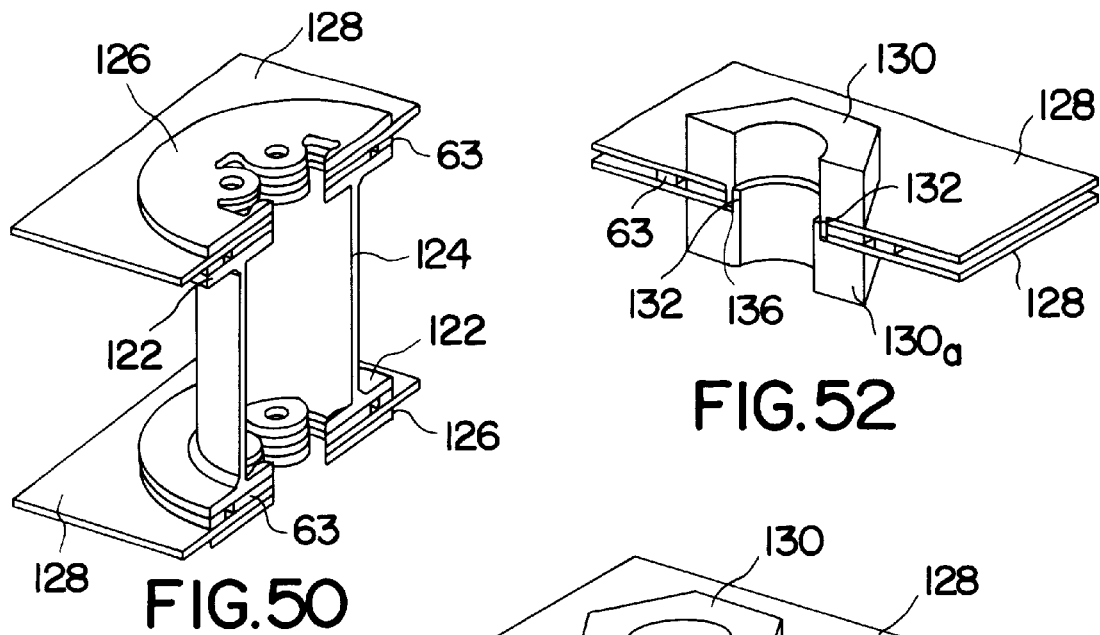
Figure 51:
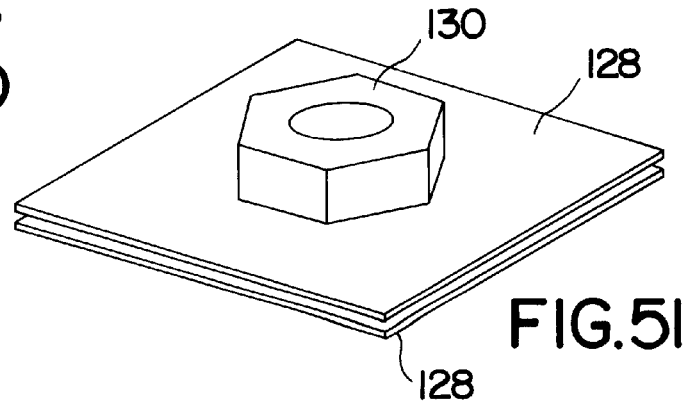
Figures 53, 54:
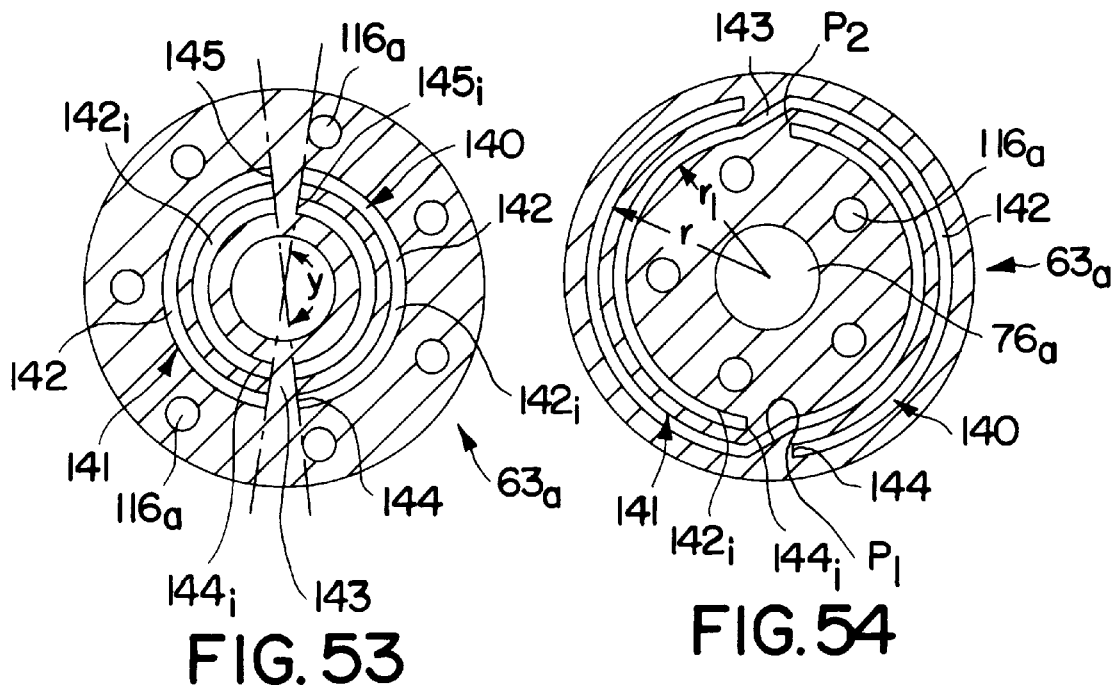

FIGS. 47 and 50 are sections of the structures shown in FIGS. 46 and 48 respectively, FIG. 51 is a perspective view of a further use, FIG. 52 is a view in section through FIG. 51 and FIGS. 53 and 54 show two plan views of sealing disks with test passages.

A catch vat or pan 10 of metal, in particular steel, for insulating liquids, which can be seen in FIG. 1, serves in particular for use in transformer stations—not shown in the drawing for the sake of enhanced clarity—with so-called transformer rails extending at a spacing relative to the bottom of the housing thereof: the rails form carriers for a transformer and usually rest on mounting profile members. The latter are disposed on the longitudinal walls of the transformer station.

The dimensions of the catch pan 10 are adapted to the respective circumstances involved. Thus for example the length a of the catch pan 10 for a 630 kVa transformer can be 1800 mm, with a width b of about 1200 mm and a height h of 350 mm, from which its volume is calculated as being about 0.71 m$^3$. That is sufficient to collect and retain undesirably escaping transformer oil.

A rear wall 14 and two lateral pan walls 16—each being angled over in FIG. 1—project upwardly from the pan bottom 12 comprising steel sheet of a thickness of about 2 mm. The front wall 18 is liquid-tightly screwed on to an abutment surface of the pan bottom 12 or the pan or side walls 16, with the interposition of sealing elements which are still to be described hereinafter.

Near the corners 20 of the pan. grounding points 24 are fitted onto an angled-over edge 22 of the pan walls 16. The grounding points 24 can serve upon transportation as anchorage points for clamping bands or belts or the like.

Extending parallel to the front wall 18 of the catch pan 10 on the pan bottom 12 are two spacer rails 26 as a support for two upwardly open channel profiles 28 which terminate at a spacing relative to the rear wall 14 of the catch pan 10. The channel profiles 28 serving as guide rails accommodate rollers of the transformer which are secured laterally in position by the limbs of the channel profiles 28; their—adjustable—center-to-center spacing e from each other therefore corresponds to the transverse spacing of the rollers.

FIGS. 2 through 4 show embodiments of the connection of the front wall 18 to the pan wall 16; formed out of the plane E of the pan wall 16 is an abutment surface 30 of a length i, which is parallel to the front wall 18. an adjoining flank surface 32 which is parallel in FIGS. 2 and 3 to the pan wall 16, and an end hooking bar 34. The flank surface $32_a$ of the structure shown in FIG. 4 is angled towards the plane E and its hook bar $34_a$ of a length $i_1$ is disposed parallel to the abutment surface 30, whereas the hook bar 34 in FIGS. 2 and 3 faces through about 45° towards the interior of the catch pan.

A side surface 36 is bent at a right angle out of the plane Q of the front wall 18 and bent out of the side surface 36 in FIGS. 2 and 4 is an abutment strip 38 which is parallel to the plane Q and which, in the position of installation, is connected to the abutment surface 30, which is also parallel thereto, of the side wall 16, by a screw bolt or stud 42 which is welded in place at one end, with the interposition of a sealing profile 40 of rectangular cross-section; at the outside surface of the abutment strip 38, the bolt 42 carries a screw nut 44 with washer 43.

The flank surface 32 of the pan wall 16, which is disposed at an internal spacing n relative to the side surface 36 of the front wall 18, with its pressure edge 33 which is formed by the angled configuration of the hook bar 34, presses a further sealing profile $40_a$ against the inside surface 19 of the front wall 18. That affords a sealed chamber 46 which is disposed in the notional flow path x (FIG. 2) of an issuing liquid and which is delimited by the two sealing profiles 40, $40_a$ and the flank surface 32 with the side surface 36; the chamber 46 is of almost rectangular cross-section of the above-mentioned width n with a height f which approximately corresponds to the cross-sectional length of the flank surface 32. The pair of sealing profiles 40, $40_a$ also results in a doubled safeguard against leakage.

The chamber 46 is filled with a flow medium 48 and thus represents a test or monitoring chamber. The flow medium can be a monitoring liquid or a gas whose increased pressure is monitored.

In the embodiment shown in FIG. 3 the side surface 36 of the front wall 18 terminates at a pressure edge 33 which forms a transition into an angularly bent hook bar 34. The pressure edge 33 presses the sealing profile 40—which is used here without openings required due to screw bolts 42—against the abutment surface 30, and the hook bar 34 serves as a support means for an end hook 50 of a separate clamping profile 52 which is of a continuous configuration or which is used in the form of portions and which bears with a support or longitudinal web 54 against the inside surface 19 of the front wall 18 and is pulled towards the inside surface 19 by the screw bolt or stud 42 or the screw nut 44 thereon. A spring action is created in that arrangement.

Such a clamping profile 52—which is held by a screw bolt or study 42 to the inside surface 19 of the front wall 18—engages with its end hook 50 behind the hook bar 34 of the flank surface 32. The described connecting location between the pan wall 16 and the front wall 18 affords, on both sides of the monitoring chamber, mutually opposite symmetry in respect of its essential holding elements 33, 34, 40, 42, 50, 52.

The FIG. 4 structure does not have the pressing edge 33; here, the two sealing profiles 40, $40_a$ are loaded in surface contact at both sides. The connection of the abutment strip 38—which is here provided with an edge strip 39 which is parallel to the plane E and which engages in protecting relationship over the sealing profile 40—to the abutment surface 30 corresponds to that shown in FIG. 2. At the other end of the monitoring chamber 46 the second sealing profile $40_a$ is pressed in protecting relationship by the hook bar $34_a$, which extends parallel to the inside surface 19 of the front wall 18, of the inclined flank surface $32_a$, against the inside surface 19; the hook bar $34_a$ carries a screw bolt or stud 42 which passes through the front wall 18.

The connecting structures described in relation to the front wall 18 and the pan wall 16 can also be provided between other pan parts, for example between a pan wall 16 and the rear wall 14 or the pan bottom 12 and one of the wall elements 14, 16, 18 surrounding same.

A further configuration of a liquid-tight connection is shown in FIGS. 5 through 7; inserted between two parallel wall parts 56, 58, into a gap 57 defined thereby, is a sealing strip portion 60 of a thickness q; screw bolts or studs 42 welded to the outside of the wall part 30 pass through the sealing strip portion 60. Formed in the two surfaces 62 of the sealing strip portion 60 is a respective pair of parallel grooves 64 of a depth $q_i$, wherein each groove 64 extends at one side of the longitudinal axis A of the strip portion; the spacings k thereof relative to the grooves 64 are the same at both surfaces, as the spacings m of the grooves 64 relative to the longitudinal edges of the strip portion. The bottom width t of the deepest part of the groove 64 which is of trapezoidal cross-section approximately corresponds to one tenth of the width g of the strip portion, and the groove wall angle w is about 45°. Those grooves 64, with the wall part 56 and 58 respectively covering them over, each form a respective monitoring chamber 46 of the kind described with reference to FIGS. 2 through 4.

The respective grooves 64 which are disposed in mutually superposed relationship on a respective side of the longitudinal axis are communicated by means of bore-type openings 66 and in the position of installation as shown in FIG. 7 they align with bores 68 in the abutment surface 30: the openings 66 create a unitary monitoring chamber 46 comprising two grooves 64 and the bores 68 make the monitoring chamber accessible from the exterior for filling and monitoring purposes.

In the embodiment shown in FIGS. 8 through 10 the sealing strip portion $60_a$ has in each surface 62 a single groove $64_a$ whose bottom width $t_1$, of for example 27 mm, is larger than half the strip portion width g of here about 45 mm.

Within the groove $64_a$ disk-shaped portions 72 project island-like upwardly from the groove bottom 70, the shaped portions 72 having a peripheral edge 73 which is of a part-circular configuration in the axial direction, while the surface $62_a$ thereof is aligned with the surface 62 of the strip portion. The peripheral edges 73 blend into side walls 74 which are parallel to the axis and which define groove passages 65 as part of the wide groove $64_a$; the cross-section of the groove passages 65 corresponds to that of the grooves 64 in FIGS. 5 through 7.

The shaped portions 72 embrace openings 76 for the screw bolts or studs 42 and seal them off with respect to the monitoring chamber 46 which is formed by the groove $64_a$ and the respective wall portion 56 and 58 disposed in spanning relationship. As shown in FIGS. 9 and 10, leading therefrom is a bore 68 in the wall part, which bore is disposed between two of the shaped portions 72 and near one of the outer groove walls 78.

Figure 11:
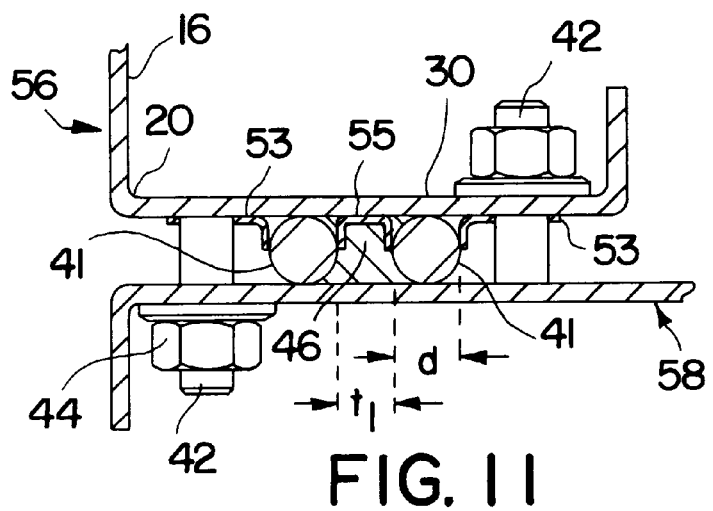

FIG. 11 shows between the wall parts 56, 58 two sealing profiles 41 of round cross-section of a diameter d, which are held at a spacing $f_1$ from each other by a channel-like intermediate profile 55 which is secured to the wall part 56; the sealing profiles 41, together with the adjoining outside surfaces of the wall parts 56, 58, define the monitoring chamber 46. Bearing against each of the round sealing profiles 41 at the outward side thereof is a respective clamping profile 53 which is of L-shaped cross-sectional configuration and through which passes a screw bolt or stud 42.

Figure 12:
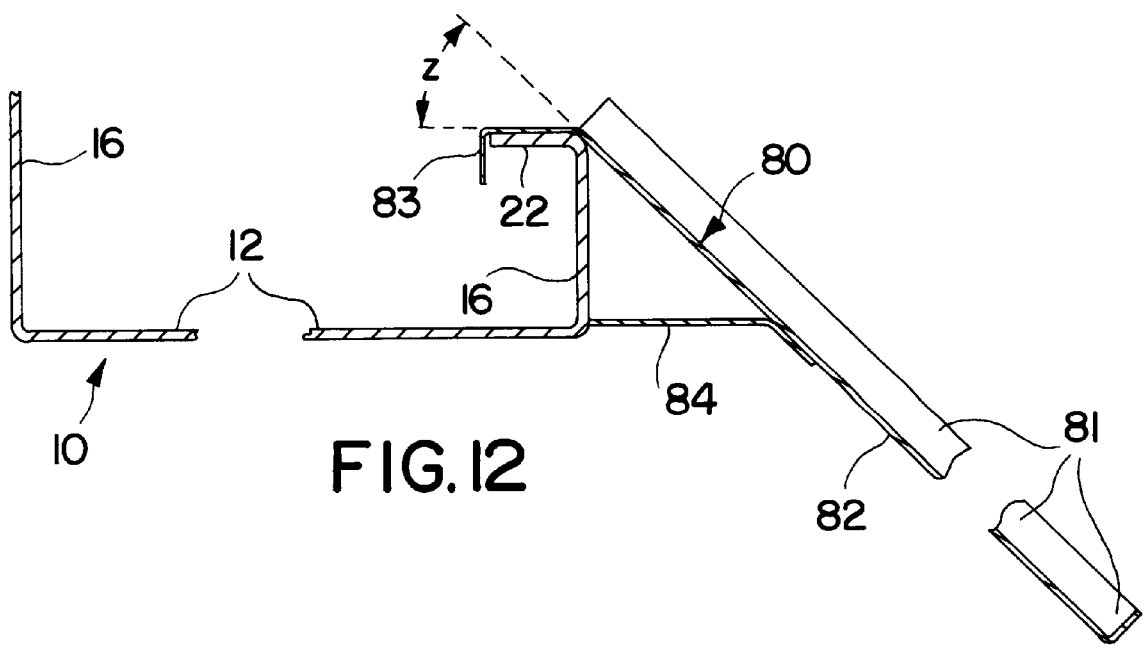

As FIG. 12 shows, in which the spacer rails 26 together with the channel profiles 28 are not illustrated, a run-in plate 80 with a side wall 81 can be fitted onto the edge 22 of the catch pan 10; the run-in plate 80 increases the catch area of the catch pan 10. The run-in plate 80 extends at an inclined angle z of about 40° relative to the horizontal edge 22 of the catch pan wall 16 and is fixed thereto by an end angle portion 83 which is bent out of the bottom 82 of the run-in plate 80, and is also supported against the pan wall 16 by means of a sheet metal rib 84 which is welded to the bottom 82 and which is parallel to the edge 22.

The configuration of the seal in FIGS. 13 and 14 approximately corresponds in cross-section to that shown in FIG. 5; in this case also a sealing strip portion $60_b$ of a thickness q extends between two parallel wall parts 56, 58 which are directed horizontally or vertically; a screw bolt or stud 42 passes through the sealing strip portion $60_b$. In the connecting region, the wall part 56 is shaped to afford a channel-like portion $56_a$ of a height s of 45 mm and a width $s_1$ of 60 mm, and is provided with an additional U-shaped profile portion 86. A further additional profile portion $86_a$ bears on the wall part 58.

Formed in both surfaces of the sealing strip portion $60_b$ of a thickness q in this case of 5 mm is a respective groove $64_b$ of a depth $q_1$ of 2 mm; the two grooves $64_b$ are aligned with each other in terms of cross-section on a common axis G and are separated by a thin bottom. The axis G extends at a radial spacing c relative to the axis M of the screw bolt or stud. The grooves $64_b$ form the test or monitoring chambers 46 and serve to monitor sealing integrity: each test chamber 46 provides for monitoring one of the sealing surfaces. The grooves $64_b$ are connected—not shown herein—at one end to a flow medium source—for example a compressor—and at the other end to a pressure measuring device; a detected pressure drop indicates leakage.

In the embodiment of the sealing strip portion $60_c$ of the thickness q as shown in FIGS. 15 and 16 the two grooves $64_c$ of the depth $q_1$ of 3 mm are disposed in respect of cross-section in side-by-side relationship, that is to say their cross-sectional axes Q are disposed in mutually parallel spaced relationship. That arrangement makes it possible to adopt a smaller thickness q of 4 mm. An interruption in the monitoring or test chamber 46 by virtue of the sealing strip portion $60_c$ being excessively firmly compressed is avoided here in a particularly good fashion. This also applies in regard to the sealing strip portions $60_d$ in FIGS. 17 and 18 which—in comparison with sealing strips $60_b$, $60_c$ of smaller thickness q—extend at one side of the screw bolt or stud 42 in the gap 47; they also include in side-by-side relationship pairs of grooves $64_c$. As shown in FIG. 18 a round seal $41_a$ can be arranged at the bolt or stud side which is in opposite relationship to the sealing strip portion $60_c$.

FIG. 19 shows two catch pans 10, of which the left-hand one provides the above-described channel-like portion $56_a$ whereas the other is provided with a channel portion $56_b$ of opposite configuration; here the sealing element $60_c$ is disposed between the respective, parallel end portions 59 of the channel portions $56_a$, $56_b$.

FIGS. 20A, 20B and 20C are intended to make it clear that each of the two monitoring or test chambers 46 is accessible by way of connecting plugs 88. FIGS. 21 and 22 show the openings 90 which are conducive for the connection of the monitoring or test chambers 46.

FIG. 23 shows the connection of an air pump as a pressure-generating means 92 by means of an adapter hose 94 which includes a non-return valve 93. A pressure display 96 is connected on the other side. When the pressure-generating means 92 is actuated, an increased pressure of between about 1.0 and 2.0 bars is created in the monitoring chamber 46 to be tested. If the pressure loss is less than 0.1 bar in 15 minutes, the sealing integrity is successful.

FIGS. 24 through 27 show a seal 98 with two monitoring chambers $46_a$ in concrete joins 100. For that purpose, either two round sealing profiles $41_b$ are fitted onto a sheet metal carrier 102 or a one-piece sealing strip portion $98_a$ with two hollow elongate portions 104 and a web 105 joining them is formed. The internal spaces 106 of the hollow portions 104 can be subsequently provided with a filling medium in order to enhance sealing integrity.

As shown in FIG. 24 such seals 98, $98_a$ are suitable in particular for joins 100 in connection with catch pans 10.

If it is necessary to glue portions of a seal, testing of the sealing integrity of the assembly is required in the region of the adhesive join. In the case of the sealing profile $40_b$ shown in FIGS. 28 and 29, which is composed of two parts 40' and 40" at the adhesive join 108, complete testing of the condition of the adhesive join is to be made possible. For that purpose, in the region of a pair of grooves $64_b$, which is separated by a web 110, the pair of grooves is connected by an opening $66_a$. When the one end of the pair of grooves which is covered over on both sides by adjoining surfaces and which forms chambers is connected to an air source 92 and the other end of the pair of grooves is connected to a pressure measuring device 96, a pressure drop detects defects in the adhesive join 108.

FIG. 30 shows side views of three sealing profiles $40_b$ with adhesive joins 108, $108_a$, $108_b$ which are of different cross-sectional configurations—a straight butt join, an inclined butt join and a doubly inclined butt join: the webs 110 which extend between the grooves $64_b$ are indicated in broken line.

In a manner corresponding to the above-discussed embodiments of seals, it is possible for example for adhesive locations 112—shown in FIGS. 31 and 32—of pan parts $10_a$, $10_b$ formed from plastic material to be afforded in an overlapping join region 114 of the length u. The monitoring chamber $46_b$ respectively associated with the adhesive location 112 is formed in FIG. 31 by a bottom bead or ridge 13 while the monitoring chamber $46_c$ in FIG. 32 is formed in a groove-like configuration in the pan bottom 12.

FIGS. 33 through 36 show embodiments with interposed sealing strip portions $60_a$, they are provided with additional polygonal openings 116 —which are here trapezoidal in plan view—, at least one circular opening $116_a$ and/or longitudinal grooves $116_b$, as can be seen from FIGS. 35 through 38. A longitudinal groove $116_b$ with recesses 117 extending therefrom and an inserted intermediate bottom 118 in the sealing element $60_f$ is indicated in FIG. 38, while FIGS. 39 and 40 show a longitudinal groove $116_b$ with a grid or grating engaging therethrough as part of a grid or grating insert 119 in sealing elements $60_g$.

Figure 41:
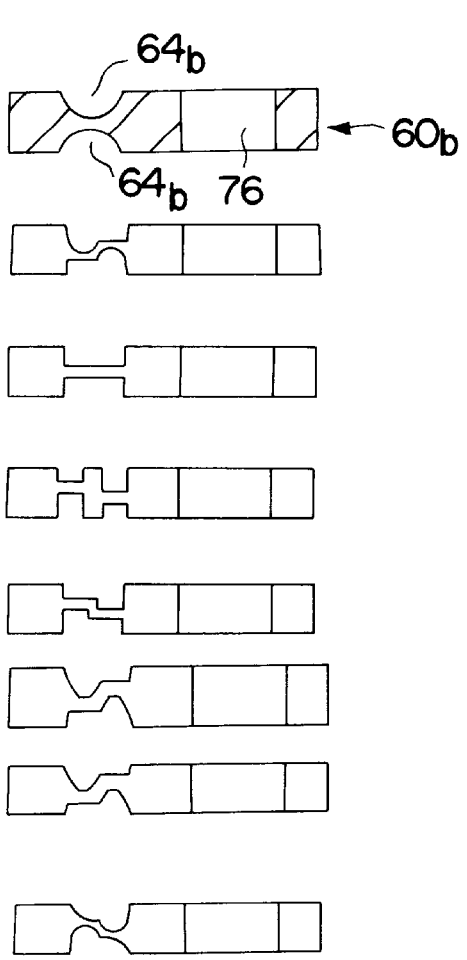
Figure 42:
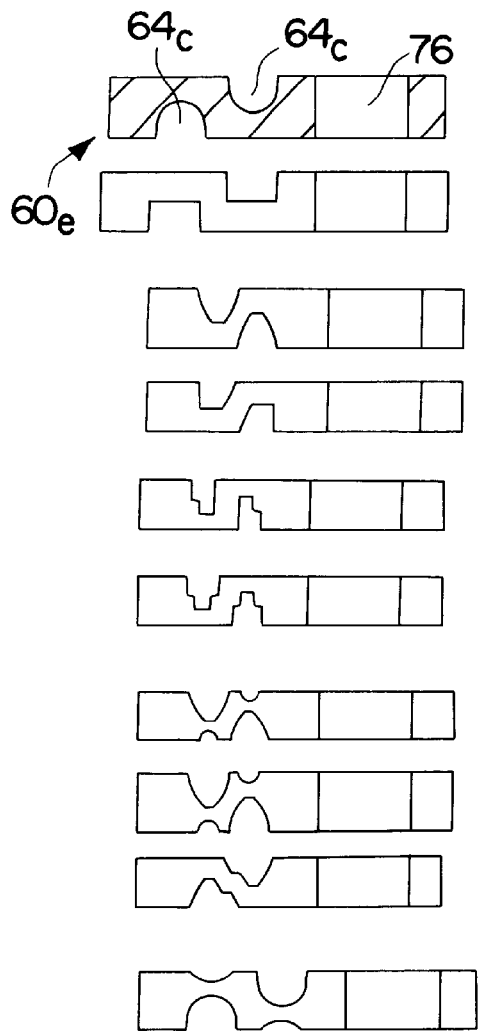

FIGS. 41 and 42 show an overview of cross-sectional shapes of sealing strip portions $60_b$ and $60_c$, wherein one groove of those pairs of grooves $60_b$, $60_c$ can serve in each case for pressure relief.

Figure 43:
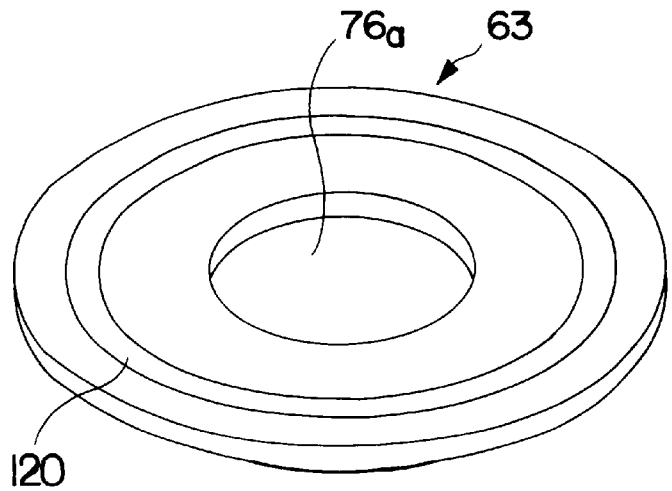
Figure 44:
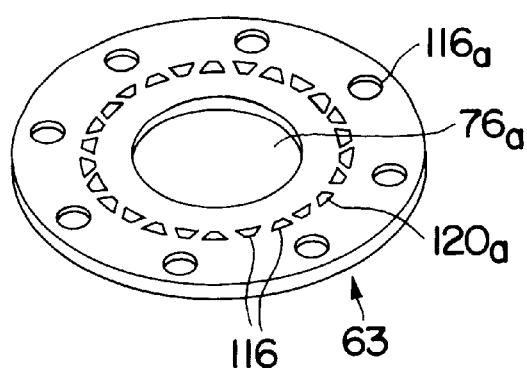

FIG. 43 shows a sealing disk 63 of circular configuration in plan, which is provided with a central opening $76_a$ and an annular groove 120. In the embodiment shown in FIG. 44, instead of the annular groove 120, a multiplicity of polygonal or trapezoidal openings 116 is arranged in a ring $120_a$; the latter is surrounded by bore-like openings $116_a$.

Figure 45:
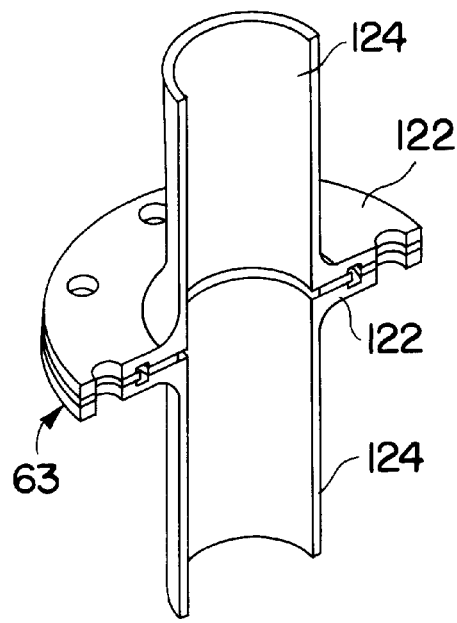
FIG. 45 shows a sectional view of an example of use in relation to FIG. 44.
Figure 49:
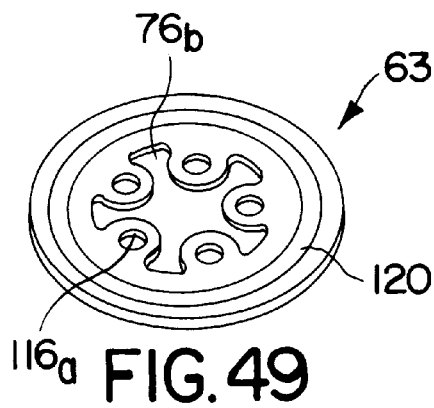

Referring to FIG. 45, the sealing disk 63 is inserted between two flanges 122 of two tubes 124, while as shown in FIGS. 46 and 47 it is fitted between two plates 128 each carrying a respective attachment portion 126. The plates 128 are disposed in FIG. 48 at a spacing relative to each other on a tube 124. This is shown in section in FIG. 51 in order more clearly to show the association of the flanges 122 and the sealing disks 63. The latter can be seen in a perspective view with its annular groove 120 in FIG. 49.

FIGS. 51 and 52 show two plates 128 with central openings for nut-like inserts 130, 130$_a$. One insert 130 engages with a screwthreaded collar 132 into a screwthreaded groove 136 in the other insert 130$_a$ which in turn is delimited by a screwthreaded collar 134. The mutually interengaging inserts 130, 130$_a$ hold the plates 128 together with the interposition of a sealing disk 63.

Finally a further test system is to be set forth with reference to sealing disks 63$a$ in FIGS. 53 and 54. Two finite or limited test passages 140, 141 and the above-mentioned openings 116$_a$ are respectively formed in those sealing disks 63$a$, between the central opening 76$_a$ and the peripheral edge 138 of the respective disk; the openings 116$_a$ are respectively arranged on a circular contour, in FIG. 52 near the peripheral edge 138 of the respective disk and in FIG. 53 between the central opening 76$_a$ and the inner one of the two test passages 140, 141.

Each test passage 140, 141 has an outwardly disposed part-circular portion 142 of a radius r and an inwardly disposed part-circular portion 142$_i$ of the shorter radius r$_1$, which each extend over an angle at the center, as indicated at y, of about 160°. At one side those two partcircular portions 142, 142$_i$ of the test passage 140 or 141 are connected by an inclined portion 143 and at the other side the two passage ends 144, 144$_i$ and 145, 145$_i$ respectively are so disposed at a spacing relative to each other that the inclined portion 143 of the other test passage 141 or 140—which is of the same configuration—can extend therebetween.

An increased pressure is built up in the test space P$_1$ between the passage ends 144 and 144$_i$, for the testing operation; the test space P$_2$ between 145 and 145$_i$ is open. If there is a communication between the test spaces P$_1$, P$_2$, no increased pressure is produced in the test space P$_1$.

Transiting of P$_2$ can be ensured by a flow between the passage ends 145, 145$_i$.

To test the other segment, an increased pressure is built up in the test space P$_2$. The test space P$_1$ is open. In this case also, no pressure is produced when there is a communication between the test spaces P$_1$, P$_2$.

What is claimed is:

1. A monitoring system, which comprises:
   a container for liquids having at least one cavity connected to at least one flow path and sealingly defined by sealing elements;
   two parts on said container which are sealingly associated with each other but releasable from each other comprising said container having side walls surrounding a container bottom and at least one releasable container part releasably sealingly connected to at least one container wall;
   wherein the cavity is adapted to be connectable as a monitoring chamber to a flow medium and fillable with the flow medium;
   wherein there are provided at least two of said sealing elements which are disposed spaced apart from each other in succession in the flow path for the container contents and said cavity is connectable to a pressure medium; and
   wherein each of the sealing elements is sealingly held between surfaces of the releasable container part and at least one side wall.

2. A monitoring system according to claim 1, wherein a connecting member passes through at least one of the sealing elements, wherein the connecting member connects the releasable container part and said side wall.

3. A monitoring system according to claim 1, wherein one of the sealing elements is pressed against the releasable container part by an end edge of a side wall.

4. A monitoring system according to claim 1, wherein said surfaces are parallel and moved together by a screw connection.

5. A monitoring system according to claim 1, wherein one of said sealing elements is held by an end edge of the releasable container part and the other by an end edge of said side wall.

6. A monitoring system according to claim 3, wherein an end edge is formed on a hook bar which is bent out of one of a surface of a side wall and a surface of the releasable container part.

7. A monitoring system according to claim 6, including a clamping profile engaging over the hook bar, said hook bar being fixed thereby to one of the side wall and releasable container part.

8. A monitoring system according to claim 7, wherein the clamping profile is held by a support leg at one side connected to one of said side wall and releasable container part at a spacing from the other of said side wall and releasable container part by at least one screw connection.

9. A monitoring system according to claim 1, wherein the sealing elements are round profiles which are held in a pair-wise manner at a spacing relative to each other by an intermediate profile of hard material.

10. A monitoring system according to claim 9, wherein the intermediate profile is of a channel-shaped configuration and bears against said round profiles.

11. A monitoring system according to claim 9, wherein two round profiles are each applied to a clamping profile having an L-shaped cross-sectional configuration through which passes a screw bolt or stud.

12. A monitoring system according to claim 1, wherein said sealing elements are round profiles and including two of said round profiles which are connected by a strip-shaped intermediate portion.

13. A monitoring system according to claim 1, wherein both the releasable container part and a side wall of the container are doubly bent forming a connecting surface and a side surface respectively and a flank surface and an abutment strip adjoining said connecting surface and side surface, wherein the flank surface and the side surface delimit the cavity at a spacing relative to each other.

14. A monitoring system according to claim 1, wherein at least one sealing element is disposed in the cavity between parallel surfaces of the releasable container part and an associated portion of the container, thereby forming two surfaces and at least one groove, and said cavity is closed by one of the releasable part and associated portion, respectively, which span over said groove, thereby forming the sealed cavity.

15. A monitoring system according to claim 14, wherein said sealing element has a longitudinal axis and extending laterally of the longitudinal axis of the sealing element in at least one of said surfaces is at least one of said grooves which communicate with a second corresponding groove through at least one opening.

16. A monitoring system according to claim 14, including a mutually separated pair of grooves with a common cross-sectional axis, wherein said grooves of the pair are separated from each other by a narrow intermediate bottom of the sealing strip portion.

17. A monitoring system according to claim 14, wherein a mutually separated pair of grooves have parallel cross-sectional axes which are displaced relative to each other.

18. A monitoring system according to claim 16, wherein the pair of grooves is provided outside a cross-sectional center of the sealing element.

19. A monitoring system according to claim 14, wherein the bottom width of said groove is of trapezoidal cross-section and approximately corresponds to between a tenth and a quarter of the width of the sealing element.

20. A monitoring system according to claim 14, wherein the sealing elements have a longitudinal axis and screw elements pass through the sealing elements on the longitudinal axis outside of the grooves.

21. A monitoring system according to claim 14, including a groove formed into each surface of the sealing element which occupies almost the entire width thereof, and shaped portions projecting from the groove bottom at openings for screw bolts or studs, which shaped portions in terms of cross-section with the groove walls delimit groove passages prolonging the groove in parallel relationship with the longitudinal axis of the sealing element.

22. A monitoring system according to claim 21, wherein the surfaces of the shaped portions are aligned with the surface of a sealing element.

23. A monitoring system according to claim 1, wherein two grooves of a sealing element are communicated with each other through an opening, wherein the opening communicating the two grooves is provided between two shaped portions near a groove wall.

24. A monitoring system according to claim 1, including a bore in an associated part opening into a groove in a sealing element.

25. A monitoring system according to claim 15, wherein associated with at least one of the openings in the sealing element is a bore in the associated part which delimits the container.

26. A monitoring system according to claim 1, wherein the sealing elements comprise two round profiles connected by a web having sides, and said cavity is associated with sides of the web, wherein the round profiles are in the form of hollow profiles with an intermediate web formed thereon.

27. A monitoring system according to claim 1, wherein an adhesive extends between two sealing elements forming an adhesive zone, wherein the sealing elements bear against each other at their ends, and an opening communicating with both sealing elements is disposed in the adhesive zone.

28. A monitoring system according to claim 27, wherein the opening extends in the region of a pair of grooves with a common central axis.

29. A monitoring system according to claim 1, wherein said parts are pan parts which partially overlap each other, and the at least one cavity is arranged in the overlap region.

30. A monitoring system according to claim 1, wherein a sealing element has one of a continuous groove-like opening, a series of polygonal openings, and round openings, and wherein said sealing element is inserted between two mutually associated plate-like parts, and at least one channel-like bottom bead or ridge of the plate like part is associated with said openings, wherein said channel-like element opens into said openings.

31. A monitoring system according to claim 30, wherein said opening in the sealing element has an intermediate insert extending therethrough.

32. A monitoring system according to claim 1, including a plate-like sealing disk with at least one annular groove, wherein the sealing element has a central opening.

33. A monitoring system according to claim 1, including a plate-like sealing disk with a ring-like arrangement of round or polygonal openings, wherein the sealing element has a central opening.

34. A monitoring system according to claim 32, including at least two peripherally extending grooves in said sealing elements which are interrupted at at least one location to form a test space.

35. A monitoring system according to claim 34, wherein each groove has an outwardly disposed part-circular portion, an inwardly disposed part-circular portion of shorter radius, and an inclined portion connecting an end of each of the part-circular portions.

36. A monitoring system according to claim 34, wherein each groove has two part circular portions with an angle at the center of about 160° and an inclined portion, wherein two adjacent ends of the grooves are at a spacing relative to each other and on both sides of said inclined portions.

37. A monitoring system according to claim 32, wherein associated with the sealing disk at least on one side thereof at least one of a flange having a hollow profile, at least one plate, and a plate-like surface.

38. A monitoring system according to claim 32, wherein the central opening of the sealing disk and said plate is assembled by a two-part, nut-like insert, wherein a part of the nut-like insert engages with a screwthreaded collar into a screwthreaded nut defined by a screwthreaded collar.

39. A monitoring system according to claim 14, wherein said containers are catch pans with catch areas therein, of which one engages with a collar portion of channel-shaped cross-sectional configuration over a profile edge of the other catch pan, and the sealing element with said cavity is provided between two end portions of a catch pan.

40. A monitoring system according to claim 1, wherein said containers are catch pans with catch areas therein, including a run-in surface connected to enlarge a catch area, wherein the run-in surface is fitted onto a container edge with an angle of inclination.

41. A monitoring system according to claim 40, wherein the run-in surface is provided outside the container edge with a side edge and at the container edge with an end angle portion.

42. A monitoring system according to claim 40, including at least one support profile between the run-in surface and the wall of the catch container.

43. A monitoring system according to claim 41, including at least one support profile between the run-in surface and the wall of the catch container.

* * * * *